United States Patent [19]

Bergida

[11] 4,326,104
[45] Apr. 20, 1982

[54] CURRENT DETECTOR

[75] Inventor: Ephraim Bergida, Petah-Tikva, Israel

[73] Assignee: Tadiran Israel Electronics Industries Ltd., Tel Aviv, Israel

[21] Appl. No.: 60,606

[22] Filed: Jul. 25, 1979

[30] Foreign Application Priority Data

Apr. 5, 1979 [IL] Israel ....................................... 57011

[51] Int. Cl.³ ............................................ H04M 3/22
[52] U.S. Cl. ........................... 179/16 AA; 179/18 FA
[58] Field of Search ........... 179/1 MN, 16 A, 16 AA, 179/18 F, 18 FA, 18 HB, 18 AH, 17 A, 17 E, 81 C, 84 L, 84 R

[56] References Cited

U.S. PATENT DOCUMENTS

| | | | |
|---|---|---|---|
| 3,746,798 | 7/1973 | Thomas | 179/18 HB |
| 3,819,866 | 6/1974 | Hawley | 179/16 AA |
| 3,829,619 | 8/1974 | Close et al. | 179/18 HB |
| 3,838,223 | 9/1974 | Lee et al. | 179/18 FA |
| 4,079,272 | 3/1978 | Howatt | 307/311 |
| 4,115,664 | 9/1978 | Laface et al. | 179/18 HB |
| 4,126,765 | 11/1978 | Calder et al. | 179/18 AH |
| 4,158,109 | 6/1979 | Dijkmans et al. | 179/18 FA |
| 4,190,745 | 2/1980 | Jusinskas, Jr. et al. | 179/18 AH |

FOREIGN PATENT DOCUMENTS 2732126  9/1978  Fed. Rep. of Germany ........ 179/18 FA

OTHER PUBLICATIONS

C. Glowienka & F. Reiley; "Telephone On/Off Hook Detector;" IBM Technical Disclosure Bulletin; vol. 16, No. 5; Oct. 1973; pp. 1558-1559.

W. Sahm; General Electric Optoelectronics Manual; 1976; p. 72.

Primary Examiner—Bernard Konick
Assistant Examiner—Randall P. Myers
Attorney, Agent, or Firm—Fleit & Jacobson

[57] ABSTRACT

According to the present invention there is provided a current detector useful in interconnection of an automatic telephone exchange with a central office via TIP and RING leads and comprising; rectifying apparatus coupled to the TIP lead for rectifying at least a portion of the current flowing therealong of either polarity; and detector apparatus receiving the rectified output of the rectifying means and providing a DC output signal indicating current passage along the TIP lead.

4 Claims, 1 Drawing Figure

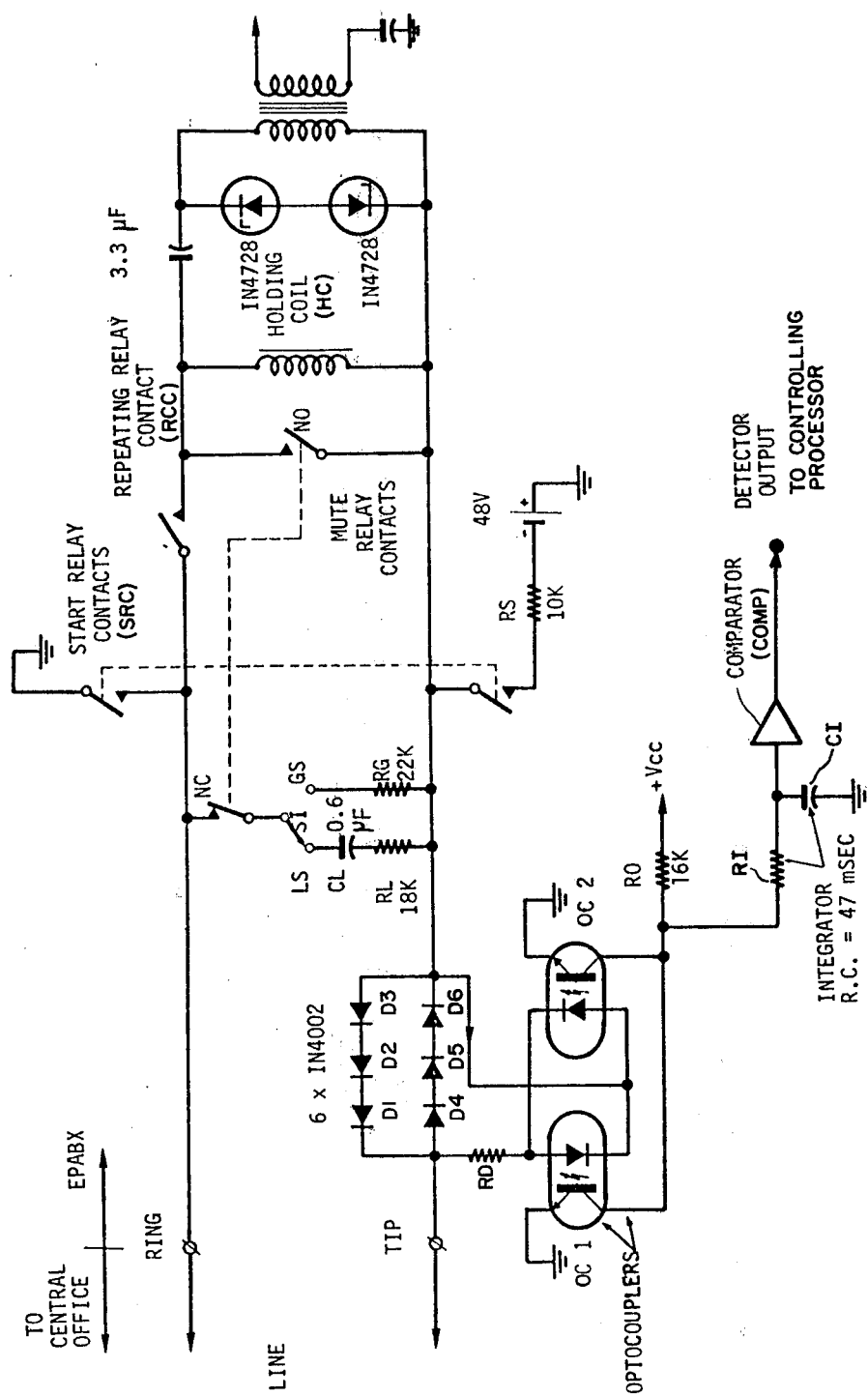

CURRENT DETECTOR

FIELD OF THE INVENTION

The present invention relates to telephony, and more particularly to electronic private automatic exchanges.

BACKGROUND OF THE INVENTION

In the interconnection of an electronic private automatic telephone exchange to a central office it is necessary to detect loop, ringing and tip lead ground currents. Conventionally these functions are accomplished by providing a separate detector for each of the above functions.

It is also known to utilize detector circuits which are connected to the ground and/or power supply of the automatic exchange. Such connections may result in limitations to the following parameters: Noise Immunity, Longitudinal Balance, AC Induction, Lightning protection, leakage current and hazardous voltages. Known circuitry does not enable interconnection to central offices having grounded ringers.

SUMMARY OF THE INVENTION

The present invention seeks to provide a current detector which is operative to detect all of the three aforementioned current flows while avoiding the limitations and drawbacks set forth above.

There is thus provided, in accordance with an embodiment of the present invention, a current detector useful in interconnection of an automatic telephone exchange with a central office via TIP and RING leads, and comprising rectifying apparatus coupled to the TIP lead for rectifying at least a portion of the current flowing therealong of either polarity; and detector apparatus receiving the rectified output of the rectifying apparatus and providing a DC output signal indicating current passage along the TIP lead.

The Current Detector (CD) is an electronic circuit used in trunk circuits connecting an EPABX to the serving central office. That single CD performs functions formally performed by several detectors.

The CD detects loop, ringing and tip lead ground currents. The primary circuit is fully floating, a property of major importance in telephone line interfacing.

BRIEF DESCRIPTION OF THE DRAWING

The invention will be more fully understood and appreciated from the following detailed description taken in conjunction with the drawing in which:

FIG. 1 is a schematic illustration of a current detector constructed and operative in accordance with an embodiment of the present invention.

DETAILED DESCRIPTION OF A PREFERRED EMBODIMENT

This invention consists of a standard Opto-coupler utilized in such a way that it performs various distinct functions, and simultaneously fulfills the required critical interfacing parameters of trunk circuits.

The circuit consists of two Opto-couplers OC1 and OC2, back-to-back connected one for each current flow direction. The Opto-coupler's diodes D1–D3 and D4–D6 are placed in series with the TIP lead at such a point as to ensure that line current flows through them in any of the set-ups in which the trunk circuit is being used. The current through the Opto-Coupler diodes is limited with a simple floating circuit, comprising diodes D1–D6 and resistor RD (discussed below), thus protecting the diodes from excessive current and enabling interfacing with varying line lengths.

The ringing current flows through a series $R_L$, $C_L$ network which bypasses the open contact RRC of the repeating relay. The Opto-couplers configuration rectifies the current, and an integrator (resistor RI and capacitor CI) produces a DC signal indicating ringing current presence.

The detector has a single output via comparator COMP indicating presence or absence of current flow, DC or AC. The controlling processor (not shown) interprets the indication according to its controlling status.

As further seen in FIG. 1, a selector SI can be set to loop start (LS) or ground start (GS) position in accordance with the type of central office equipment being used. As also seen in FIG. 1, repeating relay contact RCC and start relay contact SRC are provided, with associated relays, controlled by a controlling processor, as typically employed in such systems.

Loop Current Detection (Ground Start and Loop Start)

The LOOP CURRENT DETECTION circuit is shown in FIG. 1. Loop current flows when the Repeating Relay Contact RRC is closed. The current flows from the central office (C.O.) battery (not shown) to the Tip lead via the Ring lead, the closed Repeating Relay contact RRC, the holding coil HC and the diode D1–D6 of Opto-couplers OC1–OC2 complex. A portion of the line current, Id, flows through the Opto-coupler's diodes D1–D6 and resistor RD.

This circuit detects loop currents as low as 1.5 mADC, and at the same time is capable of carrying line currents as high as 200 mA without any risk to the components used. This is achieved by the current bypass path through the 1N4002 diodes D1–D6.

The current Id flows in either direction depending on C.O. battery polarity, activiting the Opto-coupler OC 1 or OC 2 which conducts and the output of comparator COMP indicates current presence.

The integrator (RC time constant=47 msec) network RI–C1 filters any short current spikes and pauses which may occur.

Loop Start Mode—Ringing Detection

When the selector SI is set to the LS position, the ringing voltage appears between the Tip and Ring leads. Alternating current flows via resistor RL and capacitor CL, to the Opto-couplers diodes D1–D6. Opto-couplers OC1 and OC2 conduct in alternating fashion according to the current's phase, providing full wave rectification. The Integrator network RI–CI filters out any AC component. The output of comparator COMP is a steady DC indication. The circuit is capable of detecting ringing voltages as low as 30 V rms (16–68 Hz).

Ground Start Mode-Ringing Detection

When the selector SI is set to the GS position. In this mode, the incoming ringing signal is a direct current, with or without an AC ringing current imposed on it. In both cases, the CD will detect and indicate the incoming call.

This circuit is capable of working with a GS C.O. line loop resistance of 3200 Ohm and 50 KOhm leakage.

Ground Start Mode-Start Phase

The START PHASE is a stage in the process of an outgoing call. In this stage the Start Relay Contacts SRC are closed. The circuit connects ground to the C.O. Ring lead and the C.O. is expected to respond by connecting ground to the Tip lead. The instant that this ground is connected, current flows from the local battery through resistor RS, through the Opto-coupler diodes D1–D6 to the C.O. Tip lead ground. The CD detects this current flow and notifies the processor (not shown), via the detector output, to advance to the next state.

Digit Outpulsing

Loop Start or Ground Start Mode—in this stage the circuit must provide correct impedances to be seen from the C.O. during the break and make periods. Although the CD plays no role in this stage of call process, it must not disturb it. As the presence of the network consisting RG, RL, CL can degrade the outpulsing, it is disconnected from the line by the NC contact of the Mute Relay. At the same time the Holding Coil is shorted out. The Mute Relay is kept activated during the entire outpulsing period.

It is noted by reference to FIG. 1 that the circuit connected to the Central Office has no connection to ground, except, of course, when the start relay pulls it to ground. This circuit guarantees full isolation for line voltages as high as 1500 VDC.

The invention is limited only by the claims which follow.

What is claimed is:

1. A current detector in an automatic telephone exchange interconnection circuit, useful in interconnection of an automatic telephone exchange with a central office via TIP and RING leads, for detecting any one of the loop current, ringing current and TIP lead ground current said current delector comprising:
   rectifying means coupled to the TIP lead for rectifying at least a portion of the current flowing therealong of either polarity; and
   detector means for receiving the rectified output of said rectifying means and for providing a DC output signal indicating current passage along the TIP lead;
   wherein said rectifying means produces a rectifier output, said detector means comprising an integrator for receiving and integrating said recitifier output to provide an integrated output, and a comparator for comparing said integrated output to a reference to produce said DC output signal indicating current passage along said TIP lead; whereby to detect any one of said loop current, said ringing current and said TIP lead ground current.

2. A current detector according to claim 9, further comprising limiting means for limiting the current passing through said rectifying means.

3. A current detector according to claim 2 wherein said limiting means comprises a plurality of diodes arranged in a pair of chains of opposite polarity connected in series with the TIP lead.

4. A current detector according to claim 1, wherein said rectifying means comprises a pair of back-to-back connected optocouplers.

* * * * *